Nov. 24, 1931. T. MORTON 1,833,585

CUFF LINK AND OTHER DRESS FASTENINGS

Filed June 15, 1931

T. Morton
INVENTOR

By Marks & Clerk
ATTYS.

Patented Nov. 24, 1931

1,833,585

UNITED STATES PATENT OFFICE

THOMAS MORTON, OF MOSELEY, BIRMINGHAM, ENGLAND

CUFF LINK AND OTHER DRESS FASTENING

Application filed June 15, 1931, Serial No. 544,571, and in Great Britain July 8, 1930.

This invention relates primarily to cuff links, but is applicable to other dress fastenings. The object of the invention is to provide an improved extensible connection between the end pieces of the fastening.

The invention comprises the combination with one or each of the end pieces, of a rotatable and axially movable spindle, a chain or other flexible member which can be coiled helically around the spindle, and means whereby the coiling or uncoiling of the flexible medium on or off the spindle is accompanied by an axial as well as a rotational movement.

In the accompanying sheet of explanatory drawings:—

In the construction of an extensible shirt cuff link in accordance with this invention, one of the end pieces comprises a hollow body part $a$ of any suitable hollow form; an ellipsoidal form is convenient. Within this part is arranged a fixed spindle $b$, and over the fixed spindle is mounted a hollow or tubular spindle $c$ which is free to rotate and to slide along the fixed spindle. Also around the fixed spindle is placed a helical spring $d$ which is enclosed wholly or in part by the hollow spindle. One end of the spring is secured to one end of the fixed spindle, and the other end of the spring is secured to the opposite end of the hollow spindle.

In the example illustrated the fixed spindle is formed by a headed pin which abuts at its ends against the ends of the body part. On one end is fitted a cap $e$ which is adapted to receive one end of the spring as well as the pin. The cap, pin and spring are secured together by squeezing the cap after it has been placed in position. Over the end of the hollow spindle remote from the cap, a sleeve $f$ is placed and the adjacent end of the spring is bent over the exterior of this spindle so that it is gripped when the stem is applied.

To the exterior of the hollow spindle $c$ is secured one end of a chain $g$ or other flexible member which is coiled helically around the hollow spindle. Connection of the chain or the like with the spindle is effected in the example illustrated by doubling a length of wire $h$ so that it can be engaged with one end of the chain and finally coiling the doubled wire on the spindle, this wire being secured by soldering. The outer end of the chain or the like is brought to the exterior of the body part $a$ through a side aperture formed by a central boss $i$ on the said body part. The outer end of the chain may be attached to the other and solid end piece $j$ of the link. Or two similar end pieces may be used, the outer ends of the chains being connected by a link.

It will be apparent that the distance between the two end pieces can be increased or diminished by the coiling or uncoiling of the chain on or off the hollow spindle. The arrangement is such that normally the spring holds the hollow spindle in the position at which the chain or the like is fully wound up on the spindle. When an extra tension is imposed, the chain uncoils against the action of the spring and allows the distance between the end pieces to be increased. This action permits the ends of the shirt cuff to be slipped from the wrist over the thicker part of the arm without detaching either of the end pieces of the link from the cuff.

Figure 1:
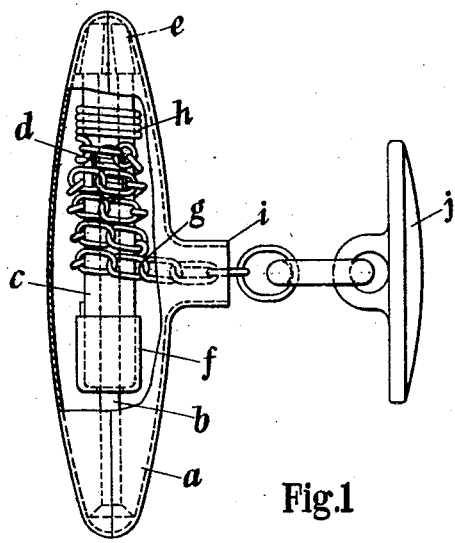
Figure 1 is a side elevation showing (with a part broken away) a cuff link constructed in accordance with this invention.
Figure 2:
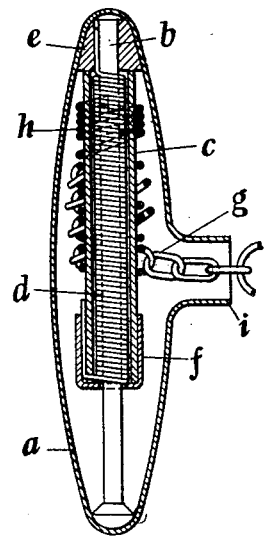
Figures 2 and 3 are sectional views showing the interior of the part of the link containing the coiling mechanism, the axially movable part being represented in different positions in the two views.
Figure 3:
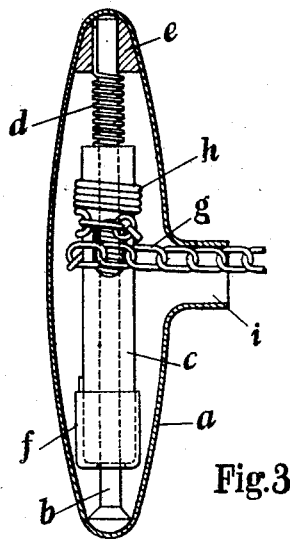
Figure 4:
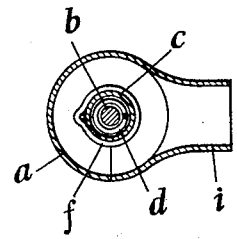
Figure 4 is a sectional plan of the part shown in Figures 2 and 3, the chain being omitted for clearness of illustration.

As already mentioned, rotation of the hollow spindle is accompanied by an axial movement of the spindle. When the chain moves through the boss $i$ it bears against one side of the boss and the tension on the chain causes the hollow spindle to move axially and extend the spring. This condition will readily be seen by comparing Figures 2 and 3. By this provision the position at which the chain leaves or passes on to the spindle can be arranged to coincide always with the position of the boss through which the chain passes, and consequently any risk of interference with the free action of the device is effectively avoided.

The invention is not limited to the example above described. If desired the spring may be of larger diameter than the hollow spindle and disposed over one end of it, the opposite ends of the spring being secured to the fixed and movable spindles. If preferred the axial movement of the spindle to which the chain or the like is attached may be determined by a screw device. Thus either the movable spindle or the fixed spindle may be formed with a quick-pitch screw thread and the other adapted to engage the thread. The function of the spring is then only to effect re-coiling of the chain or the like on the spindle when the tension is relaxed. The first described construction is, however, preferred on account of its simplicity.

It will be understood that a mechanism as above described may be arranged in each of the end pieces of the cuff link. Also the invention may be applied to other dress fastenings in which an extensible connection is required. In the example illustrated, the hollow body part $a$ is made from a single metal sheet which is shaped to form a pair of halves one of which only is formed with the boss. The interior mechanism is placed in position when the parts of the body are partially formed. After the mechanism has been inserted the halves of the body are closed together and the ends are also closed to hold the mechanism in position. The mode of constructing the hollow body may, however, be varied and forms no part of my present invention.

Having thus described my invention what I claim as new and desire to secure by Letters Patent is:—

1. In cuff links and other dress fastenings, the combination with one or each of the end pieces, of a rotatable and axially movable spindle, a flexible member which can be coiled helically around the spindle, and means whereby the coiling or uncoiling of the flexible medium on or off the spindle is accompanied by an axial as well as a rotational movement of the spindle, substantially as described.

2. In cuff links and other dress fastenings, the combination with one or each of the end pieces, of a fixed spindle, a hollow spindle rotatable and slidable on the fixed spindle, a flexible medium attached to the hollow spindle, and a controlling spring, substantially as described.

3. In cuff links and other dress fastenings, the combination with one or each of the end pieces, of a fixed spindle, a helical spring surrounding the fixed spindle, a cap on one end of the said spindle to which one end of the spring is secured, a hollow rotatable and slidable spindle arranged over the spring, means for attaching the other end of the spring to the adjacent end of the hollow spindle, and a flexible medium attached to the hollow spindle, substantially as described.

4. In cuff links and other dress fastenings, the combination of a hollow part having a lateral aperture intermediate of its ends, a fixed spindle carried within the body part, a helical spring surrounding the fixed spindle, a cap on one end of the said spindle to which one end of the spring is secured, a hollow rotatable and slidable spindle arranged over the spring, means for attaching the other end of the spring to the end of the hollow spindle remote from the cap on the fixed spindle, and a flexible medium attached to and coiled on the hollow spindle, the said medium passing through the lateral aperture in the body part, substantially as described.

5. In cuff links and other dress fastenings as claimed in claim 4, a sleeve for securing one end of the spring to one end of the hollow spindle, substantially as described.

In testimony whereof I have signed my name to this specification.

THOMAS MORTON.